Fig. I.

INVENTORS
John M. West
Frank Bevilacqua
BY Eldon H. Luther
ATTORNEY

INVENTORS
John M. West
Frank Bevilacqua
BY Elden H. Luther
ATTORNEY

INVENTORS
John M. West
Frank Bevilacqua
BY Elden H. Luther
ATTORNEY 3,276,964
SEGMENTED NUCLEAR REACTOR CORE HAVING PIVOTABLE OUTER CONTROL ASSEMBLIES
John M. West, Dunedin, and Frank Bevilacqua, Clearwater, Fla., assignors, by mesne assignments, to Combustion Engineering, Inc., a corporation of Delaware
Filed May 31, 1960, Ser. No. 32,648
22 Claims. (Cl. 176—20)

This invention relates generally to nuclear reactors and has specific relation to a novel control organization for a reactor with this control organization being particularly well adapted for use with a wholly natural circulation boiling water reactor or a boiling water reactor that has a dual circulation, i.e., has a forced circulation through the central core region and a natural or modified natural circulation through the outer core region.

It is the purpose of the invention to provide an improved reactor control system that eliminates the necessity of all or part of the now conventionally employed control rods with the control of the reactor being affected by moving the outer region of the reactor core relative to a fixed inner region. It is also the purpose of the invention to provide an improved boiling water reactor combination utilizing the aforementioned control with the boiling water reactor having a particular circulating arrangement organized, together with the control, to provide a highly efficient unit.

Although an enormous amount of development work has gone into control rods and rod drive mechanisms, such systems are beset with fundamental difficulties. Differences of opinion exist as to whether drive mechanisms should be above or below the reactor and as to what type of drive mechanisms should be used, but almost everybody would agree that none of the existing types are anywhere near ideal from the reactor designer's standpoint. Some of the well known disadvantages of the multiple vertical control rod schemes used previously in boiling and non-boiling water reactors are:

(1) A long "stroke" or total movement of rod is required. This necessitates a large clearance above or below the reactor in which the drive mechanisms operate.

(2) A large number of rods is required. A nozzle must be provided in the pressure vessel for each drive. Usually the nozzles are so large and close together that the pressure vessel must be made much thicker in the vicinity of the nozzle.

(3) Tolerance requirements on pressure vessel nozzles are usually such that the cost of these nozzles is quite significant.

(4) Special shielding must be provided around pressure vessel nozzles.

(5) The rod drives themselves are usually complicated, expensive and not completely reliable.

(6) Access to the rod drives for installations and/or maintenance is usually complicated by their close spacing.

(7) Replacement or major repair of bottom mounted drives is complicated by the fact that the radioactivity level is usually high due to gravitational settling of radioactive particles from the reactor above. The necessity of preventing leakage of water during repair or replacement of bottom mounted drives is also a problem.

(8) It is usually necessary to increase the reactor containment building height in order to accommodate either top or bottom mounted drives (particularly the latter).

(9) Blast and missile protection problems are complicated.

(10) Top mounted drives in boiling reactors must operate in a corrosive wet-steam environment.

(11) Disconnecting top mounted drives prior to removing the pressure vessel head is inconvenient and somewhat hazardous.

(12) The control rods themselves are expensive, particularly if they are made of hafnium, enriched boron, or other expensive neutron absorber. Some absorber materials become depleted, requiring replacement after a few years. The zirconium followers which are usually used on control rods are also expensive.

(13) A significant amount of useful core volume is occupied by control rod channels, making this volume useless for heat generation.

(14) The water in control rod channels creates bad hot spots in the fuel immediately adjacent to the channels.

(15) The water in control rod channels and the zirconium in the walls of the channels decrease the conversion ratio of the reactor.

(16) Vertical movement of control rods inevitably distorts the power distribution in the core to increase the overall maximum to average and thereby decreases the power output potential of the reactor.

With the present invention the necessity for control rods is eliminated or greatly reduced by the particular construction of the reactor core with the core being divided or constructed so that it has two regions or portions, one being the inner vertically disposed fixed core portion and the other being the outer laterally movable core portion. As embodied, the outer core portion may be in the form of a number of independent core sections placed about the fixed central core portion, as adjacent the sides of this control portion with these outer sections being laterally movable with respect to the inner portion to and from a position adjacent thereto and a position spaced laterally outward therefrom. As these outer section are moved toward the inner core portion the reactivity in the core, of course, increases and accordingly therefore power output of the core will increase. Thus, by laterally adjusting these outer sections, the output of the reactor may be controlled. The outer core sections are mounted so that they are urged by gravity to their outward position and when the entire control of the reactor is obtained with these laterally movable core portions the core will be sub-critical when these portions are in their extreme outer position. While the greatest advantage is obtained with the invention when the entire control of the reactor is provided by the adjustable outer portions it is of substantial advantage to employ this control in combination with control rods since the number of control rods required may be substantially reduced, thereby alleviating many of the problems associated with control rods. The combination control, i.e., control rods and the movable outer core portions, would be provided with reactors of large size while the entire control of small size reactors may be had with the lateral movable core portions.

The reactor is preferably a boiling water reactor which may be arranged to be entirely of the natural circulation type or arranged in a manner so as to have a forced circulation coolant through the fixed central core portion and a natural or forced circulation coolant through the outer or laterall movable core portion. A dual circulation arrangement for a boiling water reactor, which is described in detail and claimed in copending application Serial Number 845,531 of John M. West, filed October 9, 1959, is particularly well adapted for use with this control system with the combination of the control system employing laterally movable outwardly disposed core portion or sections and a dual circulation providing an extremely desirable and efficient organization both with regard to control of the reactor and construction and operation thereof. The employment of the dual circulation arrangement in the boiling water reactor utilizes the most advantageous circulating method in the particular region of the reactor where it is best adapted to existing operating characteristics.

It is an inherent characteristic of most water moderated and cooled reactors that there is a much greater heat output from the fuel located near the center of the core than from that located near the radial periphery. Therefore, in accordance with the dual circulation organization a forced circulation of the water is provided at the center of the core while a natural circulation is provided through the region surrounding this central portion. Since the central portion is the zone of the core which has a large power output the forced circulation through this zone will provide adequate cooling and the reactor designer will be assured that such adequate cooling will be produced. However, since the portion of the core disposed about this central region has a much lower power output, forced circulation is not necessary for adequate cooling in this region and a natural circulation may be advantageously utilized, thereby reducing the forced circulation requirements and providing a more economical organization. This forced-natural circulation combination will provide a much more economical system for reactors of the intermediate and large sizes. In addition to providing a more economical system this dual circulation arrangement for boiling water reactors provides for dual separation of the water and the steam with the separation taking place in the reactor vessel and also in a separating or steam and water drum which forms part of the circulating system. Therefore, in addition to eliminating the necessity for or reducing the number of control rods, such an arrangement alleviates the problem with regard to the separation of steam and water and with regard to the assurance that adequate circulation at minimum cost and with minimum equipment is provided.

In addition to controlling the reactor by means of lateral movement of the outer core portions the dual circulation boiling water reactor may have this control supplemented by means of controllably proportioning the subcooled feedwater to the reactor between the outer core portion and the inner core portion, i.e., proportioning the delivery of water so that the initial flow of the feedwater to the reactor is proportioned between these two core portions or regions. This supplemental control has the advantage of regulating the power output while maintaining the conversation ratio.

Accordingly, it is the object of this invention to provide an improved nuclear reactor organization.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of the invention as shown by the accompanying drawings wherein.

Figure 1:
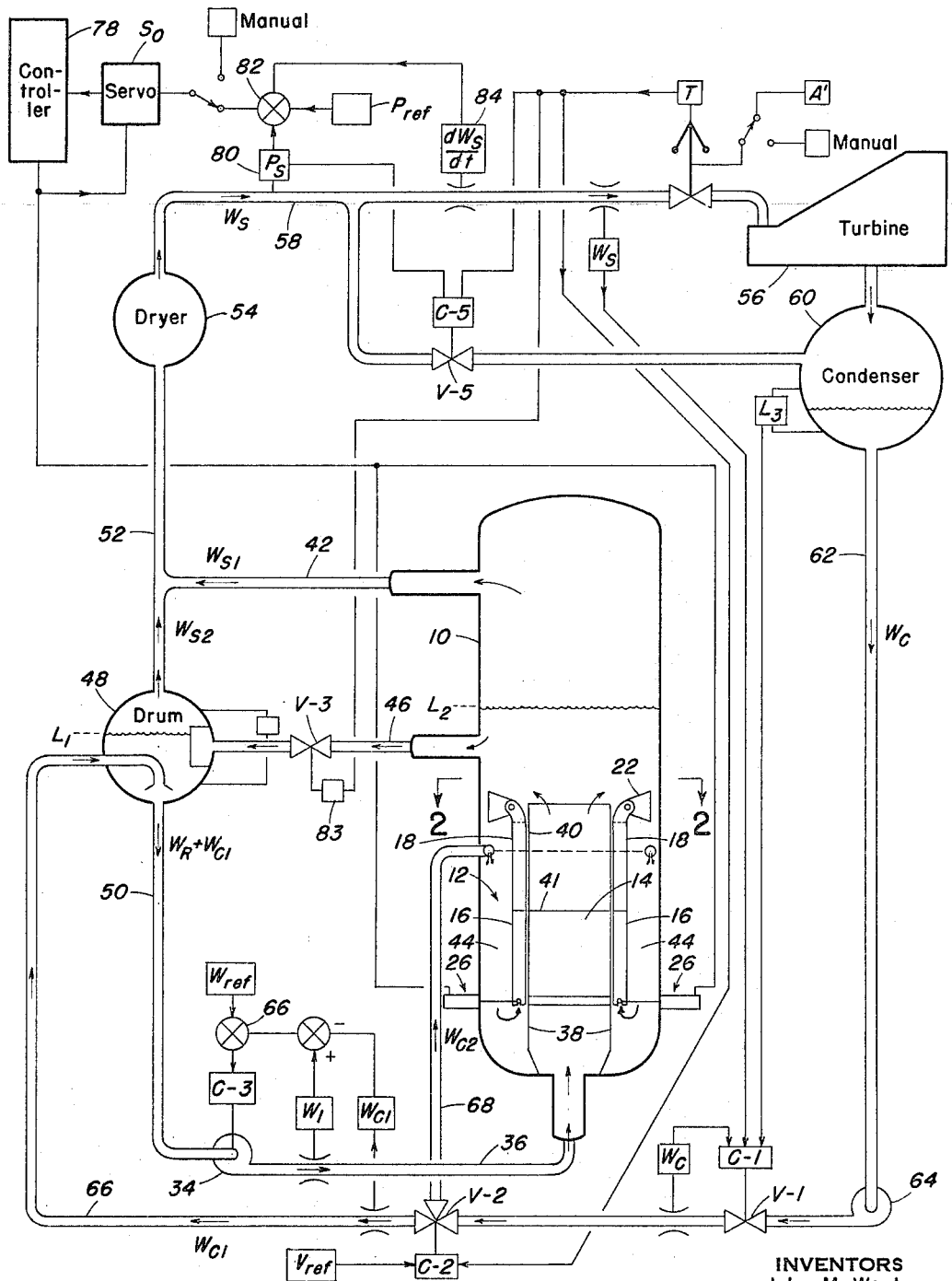
FIG. 1 is a schematic representation diagrammatically showing one embodiment of the invention.
Figure 2:
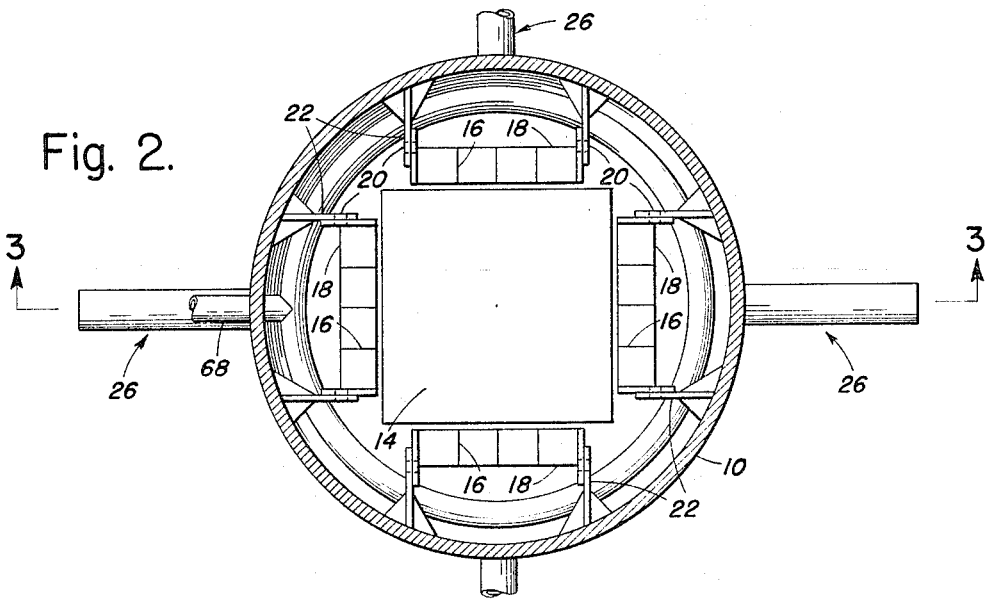
FIG. 2 is a transverse sectional view through the reactor showing the configuration and disposition of the several core sections with this figure being taken along line 2—2 of FIG. 1.

Referring now to the drawings wherein like reference characters are used throughout to designate like elements, the illustrative organization of FIG. 1 includes reactor pressure vessel 10 within which is mounted the core designated generally 12 with this core being comprised of a large number of vertically disposed, clad fuel rods, (such as zironcium tubes within which is disposed $UO_2$) that are assembled into a number of fuel assemblies, in turn, being assembled into the core. The fuel rods are spaced to provide vertical flow channels for cooling water therebetween with the core, as illustratively disclosed, being generally square in transverse section (FIG. 2).

Figure 3:
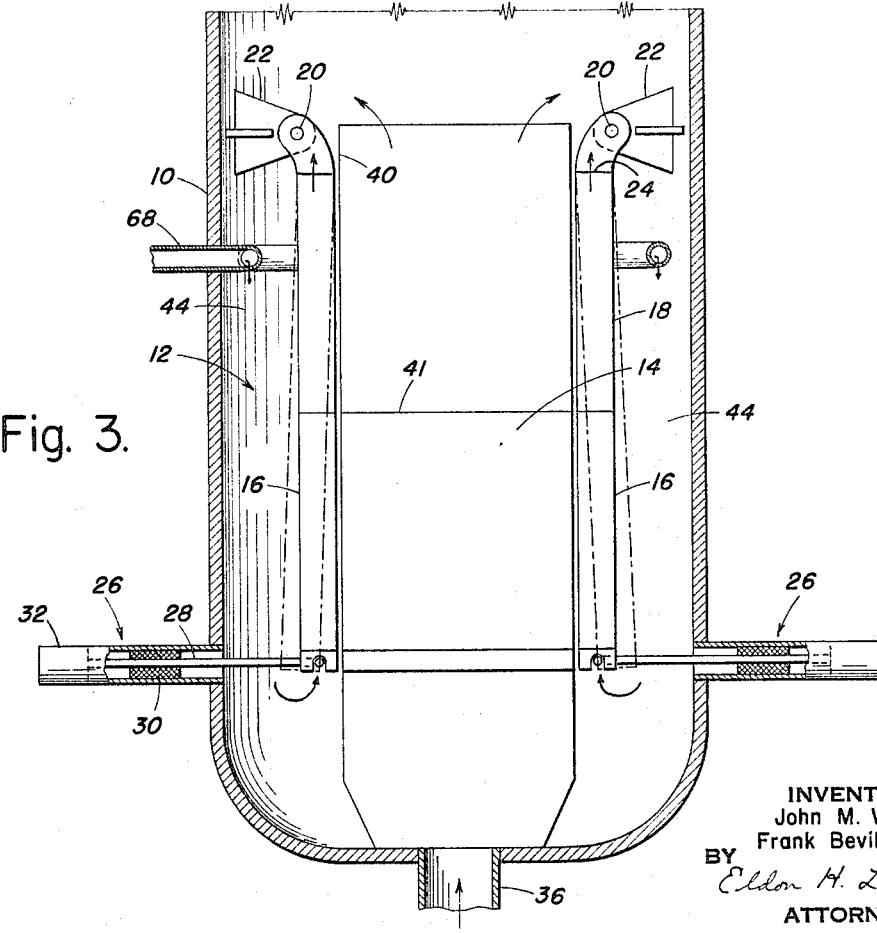
FIG. 3 is an enlarged vertical sectional view of the lower portion of the reactor vessel and of the reactor core with this section being taken on line 3—3 of FIG. 1.

As embodied, core 12 is comprised of the fixed central portion 14 about which is disposed the outer laterally movable core portions 16 with there being four of these outer core portions or sections one for each side of the fixed central core portion. In order that the outer core portion 16 may be laterally adjustable with respect to the fixed central core portion, these lateral core portions are each mounted in a vertically extending housing or riser 18 which is transversely the shape of the outer core portion and extends upwardly being bent laterally outward at its upper end and being pivotally mounted on pivot shaft 20. This shaft is mounted in a pair of brackets 22 that are secured to the vessel wall and extend inwardly therefrom as shown in FIG. 1. The risers 18, in the organization of FIG. 1, are open at their upper end 24 as well as at their lower end and the risers are pivoted about shaft 20 from a position adjacent to the fixed core portion 14 and a position laterally remote therefrom with the former position being indicated by the solid line position and the latter position indicated by the dotted line position in FIG. 3. The pivotal mounting is such that the core portions 16 are urged to their remote position relative to the fixed central core portion so that the reactor will tend to fail safe. When in their remote position the outer core portions 16 are spaced sufficiently from the central core portion to be decoupled therefrom. It is noted that in boiling water reactors it is not necessary to enlarge the reactor vessel to get the necessary space to laterally move the outer core portion. This space that is availed of in the invention for movement of the outer core portion is already present in these reactors, being required for other purposes.

The pivotal mounting for each of the outer core portions 16 is located at the upper end of the riser 18 in order that the radius of the arc through which these portions move will be relatively large. With the core portion 16 located in the lower region of the riser 18 and with this riser being of substantial length the movement of the core portions 16 relative to the fixed central core portion 14 is very close to horizontal.

Lateral adjustments of the outer core portions 16 are provided by means of a suitable motor driven actuator identified generally as 26 in the drawings and with this actuator including rod 28 that extends laterally from the reactor vessel 10 through a suitable pressure breakdown seal 30 and is connected with a motor drive 32 of any suitable type for accurately positioning the outer core portion 16 with respect to the inner core portion, with this motor providing for a relatively slow movement of the outer core portion to adjust the power output of the reactor, and having a rapid scram motion when necessary to move these outer core portions to their remote or outward position in scramming the reactor.

The necessary movement of the lateral removable outer core portions to control the reactor is relatively small, as for example, in a boiling light water reactor the outer core portions would have to be separate from the inner core portions by only a few inches to be effectively decoupled. This small amount of required movement allows the horizontal or lateral drives to have only relatively small strokes (as about 6 inches) wherefore the mechanism may be reatively simple and much simpler than those required for conventional movable control rods. In the case of a heavy water moderated reactor the movement of the outer core portions would be somewhat greater than in light water moderated reactors.

In the boiling water reactor illustratively depicted in FIG. 1 the circulating system is such that water is forced up through central core region 14 with steam and water egressing from this region into the vessel interior and with water being conveyed down around the outer core portion 16 and then passing up through these outer core portions with a portion of the water being evaporated to steam in traversal of the central core portions and the outer core portions. As embodied, the circulating system for the reactor includes circulating pump 34 the outlet end of which communicates with the lower end of reactor vessel 10 through conduit 36. In the lower end of the reactor vessel there is provided duct or baffle 38 which is effective to direct the water from conduit 36 up through the central portion 14 of the reactor with this duct preventing water from conduit 36 from bypassing the central core portion and flowing outwardly therearound and outwardly to the outer core portions. Extending upwardly from the central core portion 14 is the fixed core riser 40 (the core terminating at its upper end at the level 41) and water flows out the end of this riser together with steam that was generated during passage of the water through the central core portion. A separation of this steam and water then takes place with the steam passing up through vessel 10 and out the outlet conduit 42 that extends from the vessel. The water will then flow down, past the outer core portions in the region 44 which in effect forms a downtake, with the water entering the lower end of each of the outer core portions 16 and passing upwardly therethrough and through the riser 18 egressing through outlet 24 at the upper end of the risers with a steam and water mixture being conveyed from this outlet. A portion of this steam will pass upwardly and out the outlet conduit 42 while the remaining portion and a substantial amount of water will be conveyed from the reactor vessel through the conduit 46 which communicates with the vessel below the upper level of water therein. This conduit 46 is connected with the steam separator or steam and water drum 48 and downwardly from which extends conduit 50 that connects with the inlet of pump 34.

The steam that is separated from the steam and water mixture entering drum 48 is conveyed therefrom through conduit 52 into which the steam from conduit 42 is also introduced with the steam then flowing through drier 54 and then to turbine 56 through conduit 58. Steam from turbine 56 is condensed in condenser 60 and the subcooled condensate from this condenser is conveyed through conduit 62 to pump 64 and from this pump to proportioning valve V-2 which valve is effective to proportion the feed water flow between drum 48 and the downtake 44, for a purpose described hereinafter, with the feedwater being conveyed through drum 48 through conduit 66 and to the downtake 44 through conduit 68.

With this particular circulating system a forced circulation is provided through the central core region 14 where a high neutron flux and greater heat output are provided with this forced circulation in this region assuring adequate cooling while at the same time enabling the core to be designed for the best arrangement from a neutron consideration without having to compromise the design to get adequate cooling. The outer core region which is the region of relatively low heat output and where forced circulation is not necessary for adequate cooling, is cooled by means of natural circulation thereby reducing the cost and size as well as the complication of the required equipment. As is evident, the particular control system employing the laterally movable outer core portions 16 is uniquely well adapted for this dual circulation reactor concept giving the advantages of this concept together with the advantages of the laterally movable control arrangement.

This laterally movable control has a number of extremely desirable mecahnical advantages as compared with the conventional control rod arrangement. While this laterally movable control would give a substantial saving in reactor cost and enable simpler and more troublefree mechanism to be employed the greatest gain of this system as compared with the control rod system would be the improved performance of the reactor. Power outputs of as much as 50% greater than is normally achieved with vertical control rods would be had. This gain comes primarily from elimination of hot spots and flux distortions which are inevitable when control rods are employed in water moderated and cooled reactors. A gain in conversion ratio would also be had.

Figure 4:
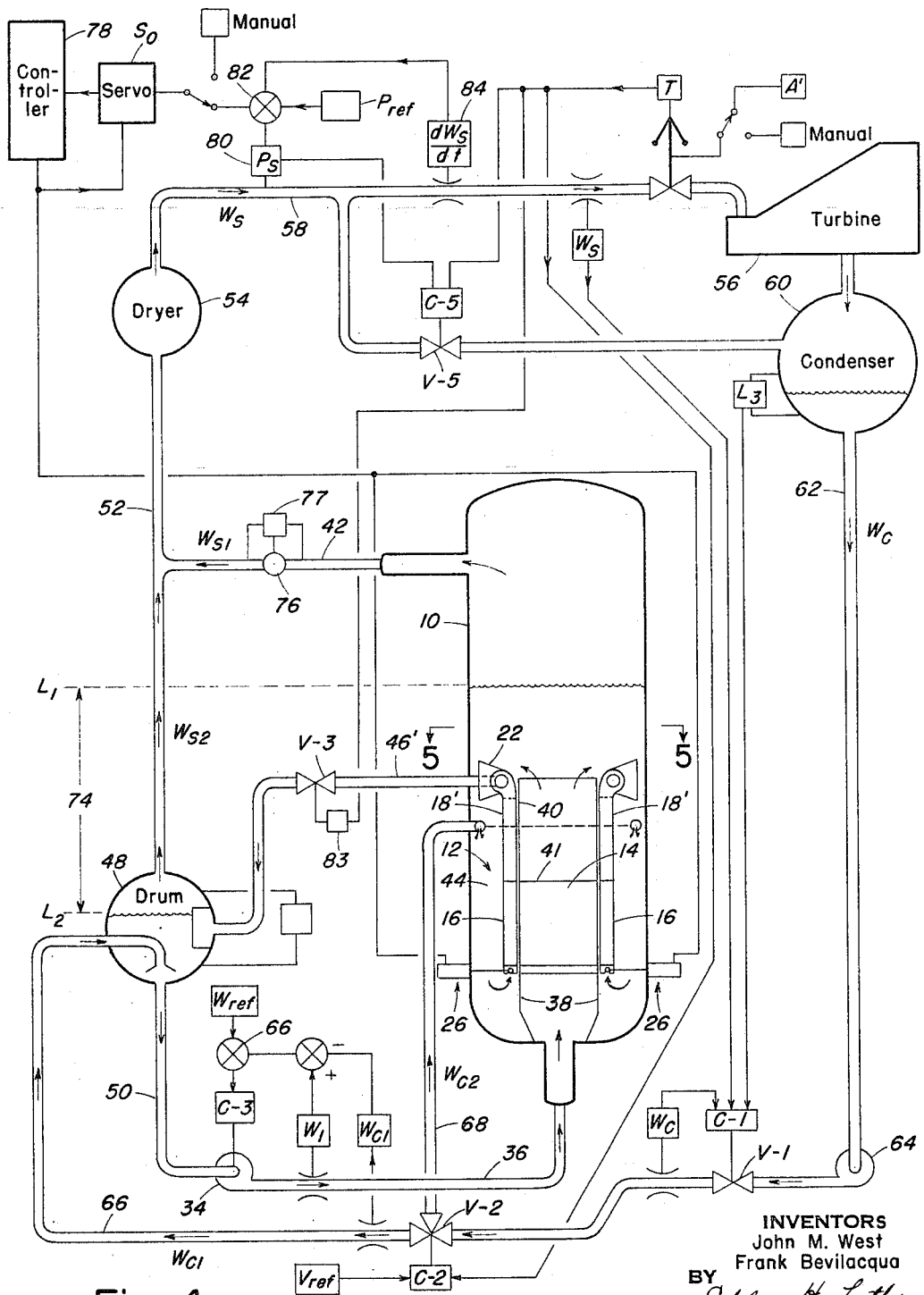
FIG. 4 is a schematic representation diagrammatically showing a modified embodiment of the invention.
Figure 5:
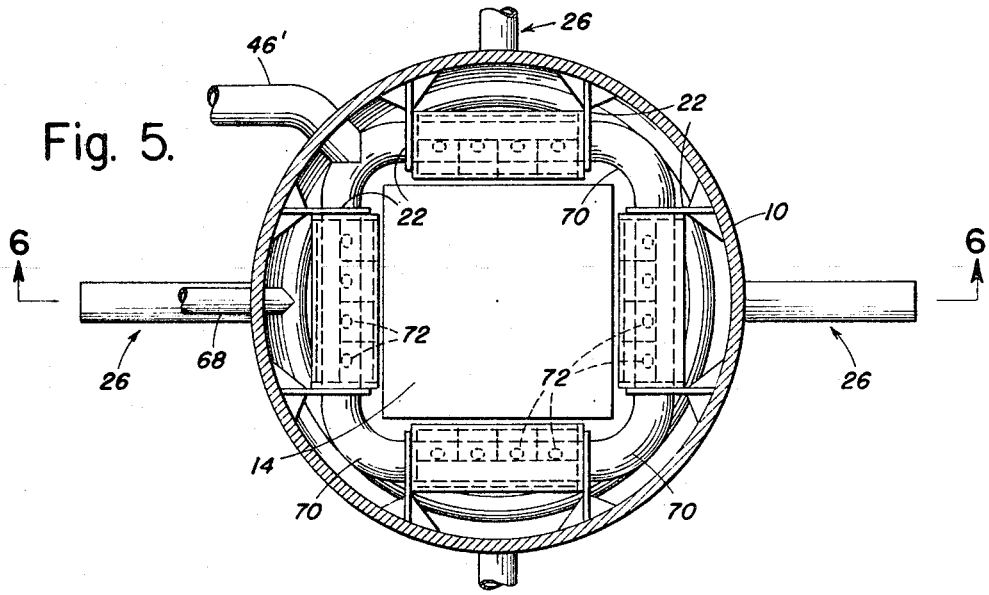
FIG. 5 is a sectional view taken along line 5—5 of FIG. 4.
Figure 6:
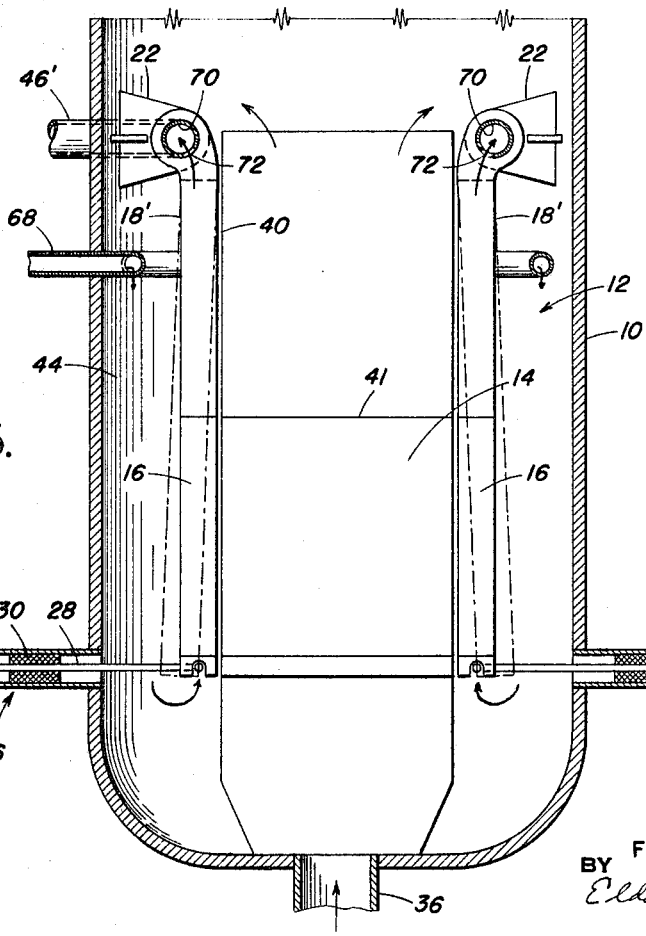
FIG. 6 is a vertical section taken along line 6—6 of FIG. 5.

The embodiment of FIG. 4 is generally similar to that of FIG. 1 except that in lieu of having the outer core portions 16 open at their upper end to the interior of vessel 10 through risers 18, these outer core portions are closed at their upper ends with regard to the interior of vessel 10 with risers 18' within which the outer core portions are positioned communicating with the interior of the generally ring-type header 70 (FIGS. 5 and 6) which forms the pivotal support for the outer core portions in the FIG. 4 embodiment. Riser 18' is not open at the upper end to the interior of vessel 10 and the upper end of the riser is enlarged as shown so that the header 70 which extends all the way around the interior of the vessel and is supported by brackets 22 may pass therethrough with the riser 18' being pivotally mounted upon the header. This arrangement is shown in detail in FIGS. 5 and 6. At the location of the riser 18' header 70 is provided with openings 72 which communicate with the interior of the risers with the steam and water mixture flowing up through the riser entering the header through these openings and with this mixture being conveyed through conduit 46' to the steam and water drum 48. This arrangement allows drum 48 to be lower as compared with its position in FIG. 1 where the liquid level in the drum and the vessel 10 and accordingly the pressures therewithin are very close to each other. By lowering drum 48 in the manner illustrated, a head of water 74 is provided between levels $L_1$ and $L_2$ which is effective to supplement the natural circulation through the outer core portions 16'.

The operation of the organization of FIG. 4 is the same as that of FIG. 1 with pump 34 forcing water exclusively up through the center portion 14 of the core where a portion of this water is converted to steam with the steam passing through outlet conduit 42. Water passes down through the downtake annulus 44 and up through the outer core portions 16 with the steam and water mixture entering ring header 70 and being conveyed to drum 48 through conduit 46'.

In addition to supplementing the natural circulation through the outer core portion 16 by the head of water 74 or in lieu thereof this circulation may be supplemented by a suitable pressure drop through conduit 42. In order that the desired pressure drop may be had and maintained an adjustable orifice 76 is provided in conduit 42 in the FIG. 4 embodiment. This orifice may be fixed, manually regulated, or automatically regulated to provide a pressure drop which increases with steam flow ($W_{s1}$), thereby enhancing the circulation of water through the second pass 16. If this orifice is automatically regulated it is adjusted by control 77 to provide a predetermined pressure drop with relation to load on the system, or, in other words, demand on the turbine.

Each of the organizations of FIGS. 1 and 2 is provided with generally the same control organization for controlling the power output of the reactor, the liquid levels in the system, the circulation rate, etc.

As embodied, the power output is controlled by a combination embodying adjustment of the laterally movable outer core portions and the adjustment of the proportioning of the feed water to the two reactor locations.

In accordance with the invention, the power is automatically controlled as a function of the demand over a relatively wide predetermined range, as for example, 100 to 40% of full power. To maintain the conversion ratio of the reactor it is preferable to change power by controlling the voids in the core. Normally, direct cycle reactors are quite limited in their use of void control as a means of automatically changing reactor power to match demand, but the two-pass or dual circulation organization allows a wide range of control of the voids in the core, as for example, approximately 40% of full power can be controlled by varying the subcooling in each pass. The additional control needed, such as the 20% if an overall control range of 60% is had, will come through automatic regulation of the lateral adjustment of the outer core portions 16. Of course the amount or proportion of control obtained by each method may be varied as desired with a major portion being provided by lateral adjustment of the outer core portions 16 if such was deemed desirable.

A change in the effective subcooling of the reactor of the invention is accomplished by varying the ratio of the condensate or feedwater ($W_c$) returning from condenser 60 to the central or first pass 14 ($W_{c1}$) with respect to that returning to the outer portion or second pass 16 ($W_{c2}$). Although the temperature of the condensate water remains essentially constant with power and below saturation temperature, the reactivity worth of voids in the second pass is less than the reactivity worth of voids in the first pass, or in other words, the effect of a change of moderator density at the center of the reactor is much greater than the effect of a change of the same magnitude but opposite direction in the outer part of the reactor. Hence putting more cold water in the first pass overrides an opposing effect of putting less cold water in the second pass, and thus a change in total power output will occur with variation in the amount of condensate returned to each pass. For the full power condition of the reactor, the condensate ratio valve V–2 will be initially set to proportion the feedwater in a predetermined manner, as for example 65% condensate to the first pass (14) and 35% condensate to the second pass (16). This reference ratio can be changed by manually varying the reference input to the controller, C–2 through $V_{ref}$. If it is assumed that the ratio is changed so that the first pass received 0% and the second pass received 100% of the condensate, a substantial power decrease is obtained (as for example 40%) due to the change in the core voids in each pass. This change is power must occur in order to maintain the reactivity held in voids constant in the steady state case.

The control effected by the combination of the lateral adjustment of outer core portion 16 and the adjustable proportioning of the feed water is achieved by the use of two servo mechanisms which operate to cause the reactor power to automatically match the turbine demand throughout the desired control range, as for example, the previously mentioned range of 40 to 100% full load.

The void control loop is a simple position type servomechanism which positions proportioning valve V–2 as a function of the turbine throttle position T. The throttle position represents flow or power demand for constant pressure, being automatically positioned through the automatic load demand device A', so that a predetermined proportion, as for example, one half, of the demand is met by positioning the proportioning valve V–2, as a direct function of throttle position in the predetermined range (40 to 100%) of full power. The reference position of the proportioning valve can be changed manually at any time to allow for greater or lesser control by the voids. This is particularly advantageous if it is desired to operate the reactor for highest neutron economy.

It should be noted that adjustment of the core portions 16 would not be required in the upper part of the control range (as from 100 to 60% full power) if the controller C–2 of the valve V–2 were made to function as a proportioning servomechanism in which the final position of the valve was determined not by the throttle position but by zero error between turbine power demand and reactor power. In this case, the void control system could control a percentage of full power (as about 40%) without movement of the lateral adjustable core portion 16.

A predetermined percentage of full power is controlled by the adjustment of these laterally movable core portions 16. As embodied, the servo $S_o$ will position the core portions 16 through control 78 and motors 26 to hold the pressure of the reactor equal to the reference pressure $P_{ref}$. Since the steam pressure P, delivered to the turbine will tend to vary with demand, this is the only signal required for the servo with this signal being received through the pressure responsive device 80 and controller 82. However, to obtain a faster and more stable response of the servo to changes of power demand, an additional signal is added to the pressure error. This signal is proportional to the rate of change of flow and is obtained by simply differentiating the steam flow $W_s$ to the turbine through differentiating device 84.

Under normal operation with automatic load demand A', a change in load and will cause the throttle position T to change. This change will be reflected as an automatic change in the subcooling of the two passes because of the change in the position of the proportioning valve V–2 which follows the turbine throttle position through controller C–2. At the same time, the change in throttle position T causes a steam flow ($W_s$) change which automatically causes the motors 26 to move the outer core portions 16 as long as the flow is changing. If the stored energy in the reactor system plus the accumulated power changes due to the void and outer core portion control systems cannot accommodate the change in demand, the reactor or steam pressure ($P_s$) will start to change. This will cause a further adjustment of the outer core portions until both pressure and turbine demand are satisfied. The controls are such that if the load demand decreases, a greater proportion of the feedwater will go to the second pass 16 and a lesser portion to the first pass 14, and the outer core portions 16 will be moved away from the center core portion 14 while if the load demand increases an opposite action will take place.

In order to protect the reactor from damage due to high pressure, a bypass valve V–5 controlled by controller C–5 is included in the reactor control system. This valve is closed during normal operation of the turbine at its design pressure, as for example, 1250 p.s.i.g., but will bypass reactor steam whenever the turbine inlet pressure increases beyond a given pressure, such as 1270 p.s.i.g. The quantity of steam bypassed will be proportioned to the increased pressure over normal pressure in order to maintain rector pressure after the reactor power had decreased. The capacity of the valve V–5 will be such that when fully open it will pass an amount of steam in excess of the full power output of the reactor.

Because it is possible to get power transients in the reactor if the turbine throttle valve closes suddenly, the closure of this valve will immediately trip the bypass valve open and scram the reactor. As the power of the reactor drops, the pressure will fall and the bypass valve will start to close to maintain reactor pressure.

In addition to the reactivity control system satisfactory operation of the plat control system is dependent on maintaining flows and water levels in various parts of the system.

The flow condensate $W_c$ returning to the reactor is controlled by a conventional throttling valve V–1, through controller C–1 which receives its action signal from the difference between the flow of steam $W_s$ to the turbine and the flow of total condensate $W_c$ to the reactor, with the condensate input to the reactor equaling the steam flow therefrom and with suitable sensing devices sensing these flows as diagrammatically illustrated.

In addition to making the steam flow $W_s$ equal to the condensate flow, $W_c$, the position of the throttling valve, V–1, is modified by a signal $L_3$, which is proportional to the difference between the reference level to be maintained in the condenser and the actual level.

The water levels $L_1$ in the reactor and $L_2$ in the steam separator are interdependent and are initially determined by the recirculating water rate, $W_r$ and the setting of the variable flow resistance valve V–3 between the outer core portion or second pass 16 of the reactor and the steam separator drum 48. For a given recirculating rate, $W_r$, levels $L_1$ and $L_2$ will be determined by the difference in head required to overcome the pressure drop in the connecting line 46 between the second pass 16 and the steam separator drum 48. For a constant water recirculating rate this level will remain constant except for small variations due to changes in power which cause changes in the pressure drop in the second pass and between the second pass and the steam separator drum. Variation of the levels $L_1$ and $L_2$ in the same direction, so that the differential level remains constant, must result in a change in level $L_3$ in the main turbine condenser hot well. Since this has a level controller associated with it, correction of $L_1$ and $L_2$ takes place by the correction of $L_3$.

High and low level alarms are also included at the reactor, steam separator, and main turbine condenser, forming part of the level sensing and controls mechanism at these locations to warn of any leakage in the water system or any malfunction of the controllers.

Although no automatic control of $L_1$ and $L_2$ has been incorporated in the illustrative design, the adjustment of the levels may be had by manually varying the flow resistance of valve V–3, or the recirculation rate $W_r$, or, if desired, automatic adjustment of valve V–3 and the recirculation rate may be provided. If automatic adjustment is used, the setting of valve V–3 is determined by controller 83 in such a way that there is predetermined setting of V–3 for each position of the turbine admission valve. In this way the flow resistance of V–3 can be reduced by the desired amount as the steam flow increases with power level thereby compensating for the additional drop in the second pass.

As was pointed out hereinbefore, changes in recirculating rate will change the level in the reactor. In addition, it will cause a variation in the power of the reactor. To maintain the recirculating water ($W_r$) constant, a variable speed drive is used on the recirculating pump 34 and controlled by the controller C–3. The control system for this drive maintains the recirculating water rate ($W_r$) constant and equal to the reference rate ($W_{ref}$) independent of the rate of condensate return with this system, sensing the difference between the flow ($W_i$) through the central portion and the proportion of the feedwater delivered to the central portion ($W_{c1}$) (by means of the diagrammatically illustrated devices) which difference represents the water recirculated ($W_r$) and comparing this with the reference flow $W_{ref}$ through control device 66 which in turn controls controller C–3.

While the control arrangement employing pivotally mounted outer core portions has been shown and described as employed in a boiling water reactor having a dual circulation and in combination with a control arrangement employing proportioning of the subcooled feedwater in such a reactor to provide a highly efficient, practical and novel combination, this control by lateral movement of the outer core portion may be employed in a boiling water reactor of the wholly natural circulation type and apart from the proportioning feedwater control, which may well be the situation in small boiling water reactors, or it may be employed in combination with a boiling water reactor having control rods, which would probably be the situation in very large boiling water reactors, or by suitable flexible joint attachments to the outer lateral moving core portions can use other coolants (liquid such as $D_2O$, diphenyl, etc., or gas) under forced or natural circulation conditions and in pressurized or boiling reactors. However, in order to minimize design problems, the moderator surrounding and the coolant flowing through the movable core portions should be the same material, although it may be in a different physical phase.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A nuclear reactor comprising an upright core mounted within a vertically disposed vessel such that a space is disposed about the core between the core and the vessel interior, said core having a fixed central portion, which portion consists of a very substantial portion of the core and symmetrically arranged outer portions disposed thereabout with each of these outer portions comprising a substantial portion of the core, means for establishing a circulation of a moderator-cooling fluid through said core including said outer portions and while permitting lateral movement of the outer portions relative to the central portion and with said space having said fluid disposed therein, said outer portions being mounted in the vessel so that each is laterally movable as a body relative to the fixed central core portion within said space to and from an inner position adjacent to said central core portion and an outer laterally remote position relative to said central core portion, and motor means operative to controllably adjust the outer core portion laterally of said fixed central portion to adjust the reactivity of the reactor.

2. The organization of claim 1 wherein means are provided so that said outer portions are biased to an outward remote position from the central portion.

3. A nuclear reactor comprising a vertically disposed vessel, a core in said vessel and through which a moderator-cooling fluid is conveyed, said core having a fixed central portion, which portion consists of a very substantial portion of the core and a separate outer portion disposed about the central portion, means for establishing a circulation of said fluid through the core including the outer portion and while permitting lateral movement of the outer portion relative to the inner portion, said outer portion including a number of sections symmetrically disposed about the central portion with each of these outer core portions comprising a substantial portion of the core and with each section being pivotally mounted in the vessel for lateral movement as a body to and from a position adjacent said fixed portion and a position laterally remote from said fixed portion, and means operative to controllably adjust the movement of said outer portion to control the reactivity of the reactor.

4. The organization of claim 3 wherein the pivotal mounting of each of said sections is such as to urge the same by gravity to the position laterally remote from the fixed central portion.

5. A nuclear reactor comprising a vertically disposed vessel having mounted therein a core, means for circulating a moderator-coolant through the vessel and core, said core having a fixed portion of polygonal horizontal section and comprised of spaced generally vertically disposed fuel elements, a movable core portion also comprised of spaced generally vertically disposed fuel elements adjacent each side wall of said fixed core portion, each of these movable core portions comprising a substantial portion of the core and with each of said movable core portions being movable as a body laterally of the fixed core portion to and from a position adjacent thereto and a position laterally remote therefrom with the power output of the core being increased in response to inward movement of the movable core portions, and motor operated means effective to adjustably position said movable core portions.

6. The organization of claim 5 wherein said movable portions are pivotally mounted within the vessel for said lateral movement with the pivotal mountings being such that said portions are biased by gravity to their laterally remote positions.

7. A boiling water nuclear reactor comprising an upright core disposed within a vessel, said core having a vertically disposed fixed central region and an outer region disposed about the central region, a circulating system for circulating water through the core including pump means which has its outlet communicating with the central region of the core to force water upward therethrough, means preventing water from the pump from flowing through the outer core region until it has traversed said central region, the upper end of the central core region and the lower end of the outer core region being open to the interior of the container, said outer core region being laterally movable between a position adjacent the inner core region and a position laterally remote therefrom, and means for controllably adjusting the lateral position of the outer core region relative to the inner core region to control the power output of the reactor.

8. The organization of claim 7 wherein the outer core region is open to the vessel interior at its upper end.

9. The organization of claim 7 wherein the outer core region is closed to the vessel interior at its upper end but communicates with said circulation system, this system including a steam separating drum wherein the steam generated in the outer core region is separated from the circulating water.

10. A power plant system comprising a boiling water nuclear reactor having a core that has a fixed central portion and a laterally movable outer portion, means for conveying water through these core portions with a portion of the water being converted to steam during such passage, a prime mover supplying a load, means conveying said steam at a predetermined pressure to said prime mover as the motive fluid thereof, means supplying subcooled feedwater to the reactor at two locations such that at one location the initial traversal of the core by this water is through said central portion and at the other location the initial traversal of the core by this water is through said outer portion, and means for regulating the power output of the reactor including means to controllably position the laterally movable outer core portion between a position adjacent the central portion and a position laterally remote therefrom and means to controllably proportion the feedwater between said two locations.

11. A power plant system comprising a boiling water nuclear reactor having a core disposed within a vessel with the core having a fixed central portion and an outer portion laterally movable relative to the central portion, the upper end of the central portion and the lower end of the outer portion being open to the vessel interior, a circulating system for circulating water through the vessel and core including pump means operative to force water through the central portion, means to prevent water from said pump means from entering the outer core portion until it has traversed the inner core portion, a portion of the water being evaporated to steam during traversal of the core, a prime mover supplying a load, means conveying said steam at a predetermined pressure to said prime mover as the motive fluid thereof, means operative to supply subcooled feedwater to the reactor at two locations such that at one location the initial traversal of the core by this water is through said central portion and at the other location the initial traversal of the core by this water is through said outer portion, and means for regulating the power output of the reactor including means to controllably position the laterally movable outer core portion between a position adjacent the central portion and a position laterally remote therefrom and means to controllably proportion the feedwater between said two locations.

12. The organization of claim 11 wherein the outer core portion is open at its upper end to the vessel interior.

13. The organization of claim 11 wherein the outer core portion is closed at its upper end to the vessel interior but communicates with said circulating system.

14. The organization of claim 11 wherein said laterally movable core portions being in risers open at the bottom and closed at the top, said risers being pivotally mounted at their upper ends within the vessel, means connecting the upper end of the risers with the circulating system.

15. The organization of claim 11 including means responsive to the pressure of the steam delivered to the prime mover for regulating the positioning of the lateral core portions and means responsive to the demand on the prime mover for regulating the proportioning of the feedwater.

16. A boiling water nuclear reactor comprising an upright vessel, a core disposed therein and having a fixed central portion about which are symmetrically arranged outer core portions laterally movable with respect to the fixed central portion, means for circulation of water through the core with that in the outer core portions being of the natural circulation type, each of said outer core portions being mounted in vertically extending riser members with each such member having a vertical dimension substantially greater than that of its associated core portion and with the core portion being mounted in the lower region of the riser, said riser members being pivotally hung from their upper ends so as to provide the desired lateral movement of the outer core portions relative to the fixed central core portion, and means operative to laterally adjust each of the outer core portions between a position adjacent the central core portion and a laterally outward position remote from said central core portion.

17. A nuclear reactor comprising a core disposed within a vessel, said core having a fixed upright central region of polygonal transverse section, outer regions disposed adjacent each side of said central region and laterally movable relative thereto, each of said outer regions being disposed within a riser which extends a substantial distance above the core and is pivoted at its upper region for pivotal movement of the outer core region toward and away from the central core region, and means to adjust said outer core regions about their respective pivots.

18. The organization of claim 17 wherein the pivotal mounting for the outer core region is located outwardly of the outer core region so that said outer core regions are biased to a position remote from the central core region.

19. A boiling water nuclear reactor system comprising in combination a core disposed within a vessel, said core having a fixed central portion of polygonal transverse section, laterally movable outer portions adjacent each of the side walls of said central portion, said outer portions being pivotally mounted for movement between a position adjacent the central portion and a position laterally remote therefrom, means for laterally adjusting said outer core portions, means supplying subcooled feedwater to the boiling water reactor including means to introduce said water at a location for initial traversal of the central core portion of the core and means to introduce the water for initial traversal through the outer core portions and means operative to adjustably proportion the introduction of the feedwater between these two locations.

20. A nuclear reactor comprising a vessel having mounted therein an upright core, means for circulating a moderator-coolant through the vessel and core, said core having a fixed central portion comprised of spaced generally vertically disposed fuel elements, a plurality of outer portions perimetrically spaced about said central portion and each of which is comprised of spaced generally vertically extending fuel elements, each of said outer portions being pivotally mounted about a generally horizontal axis for movement laterally of the fixed central portion to and from a position adjacent thereto and a position laterally remote therefrom, the pivotal mounting being so disposed that the outer core portions are urged by gravity to their laterally remote position, and means for adjustably positioning these movable outer core portions.

21. A nuclear reactor comprising a core through which a moderator-coolant is conveyed and which is disposed within a vessel, said core having a fixed upright central region, outer regions disposed about the central region and laterally movable relative thereto, each of said outer regions being disposed within a riser that extends vertically beyond the core and is pivoted at its extended end for pivotal movement of the outer core region toward and away from the central core region, and means to adjust said outer core regions about their respective pivots.

22. The organization of claim 21 wherein the pivotal mounting for each of the outer core regions is located such that said outer core regions are biased by gravity to their position away from the central core region.

References Cited by the Examiner

UNITED STATES PATENTS 2,806,820   9/1957   Wigner _____ 204—193.2
2,936,273   5/1960   Untermyer _____ 204—193.2–.3

FOREIGN PATENTS 71,979     10/1959   France.
1,183,438   1/1959   France.
1,053,684   3/1959   Germany.

OTHER REFERENCES

Nuclear Power, September 1957 page 369.
Nucleonics vol. 13, No. 12, December 1955 p. 42–45.
Proceedings of the Second International Conference on the Peaceful Uses of Atomic Energy vol. 9, p. 66, 1958.

L. DEWAYNE RUTLEDGE, *Primary Examiner.*

ROBERT L. CAMPBELL, REUBEN EPSTEIN, CARL D. QUARFORTH, LEON D. ROSDOL, *Examiners.*

S. F. STONE, M. R. DINNIN, H. E. BEHREND,
*Assistant Examiners.*